July 24, 1934.  L. E. LA BRIE  1,967,414
BRAKE
Filed Oct. 30, 1929   2 Sheets-Sheet 1

INVENTOR.
LUDGER E. LA BRIE
BY   *M. W. McConkey*
ATTORNEY

July 24, 1934. L. E. LA BRIE 1,967,414
BRAKE
Filed Oct. 30, 1929 2 Sheets-Sheet 2

INVENTOR.
LUDGER E. LA BRIE
BY
ATTORNEY

Patented July 24, 1934

1,967,414

UNITED STATES PATENT OFFICE 1,967,414

BRAKE

Ludger Elizé La Brie, South Bend, Ind., assignor to Bendix Brake Company, South Bend, Ind., a corporation of Illinois Application October 30, 1929, Serial No. 403,372

11 Claims. (Cl. 188—78)

This invention relates to brakes and is illustrated as embodied in one type of automobile brake in which the braking mechanism consists of a plurality of shoes within the brake drum.

One object of this invention is to eliminate the click which occurs when the brake drum thrusts one of the shoes against an anchor. This is accomplished by the use of a bell crank actuating anchor, which is so arranged as to always contact with the shoe.

Other objects and advantages will appear from the following description.

Figure 1:
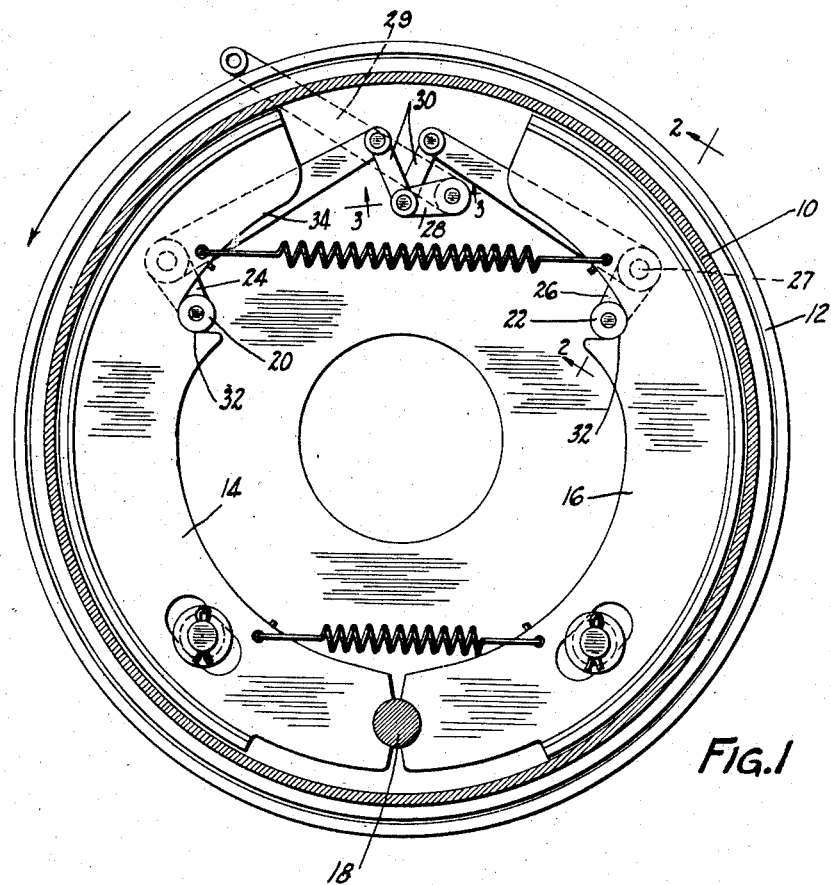
Figure 1 is a view illustrating one embodiment of the invention.
Figures 2, 3:
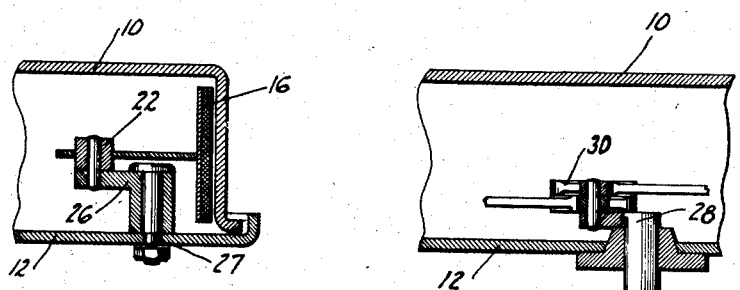
Figure 2 is a cross section taken along the line 2—2 of Figure 1.
Figure 3 is a cross section taken along the line 3—3 of Figure 1.
Figure 7:
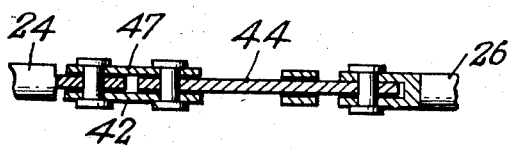
Figure 7 is a partial section on the line 7—7 of Figure 5.

The braking mechanism is supported within the drum 10 by the backing plate 12. The braking friction is preferably furnished by the two shoes 14 and 16 which are articulated by the floating pivot 18. Thus it is seen that the shoes are freely floating, that is, movable in any direction within certain limits. The brake shoes are thrust outwardly against the drum by the rollers 20 and 22 which are mounted on the bell cranks 24 and 26 which are pivoted to the backing plate by means of anchors or pivot pins 27, said bell cranks being turned by the crank 28 through the drag links 30. The crank 28 may be actuated in any desired manner as by swinging arm 29 downwardly. The rollers 20 and 22 bear against the shoe in the sockets 32 which preferably have a curvature of slightly greater radius than the radius of the rollers 20 and 22.

It will be seen from an examination of the drawings that as the brake shoe is pressed against the drum it will move in the direction of rotation of the drum and that if the drum is moving in the counterclockwise direction, the shoe 14 will be moved in a direction away from the roller 20. The roller 20 will continue to contact with the portion 34 of the web which preferably has the axis of the drum as a center of curvature, and shoe 16 will anchor on roller 22, the anchoring torque being transmitted to the backing plate through the pin 27. Now if the drum is reversed it will thrust the brake shoes in the opposite direction, the roller 20 and its pin 27 becoming the anchor. The roller 20 is already in contact with the shoe and because the socket 32 is of a wider curvature than the roller 20, there will be no click as the shoe is thrown back. Likewise, as the roller 22 is constantly in contact with shoe 16, and in engagement with socket 32 until the braking starts, there can be no clicking on that side.

The torque of the anchored shoe (14 or 16), when the brake is applied as described above, will be transmitted in part to the anchors 27 and (unless the arm 26 is exactly in the line of thrust) in part back through the applying means to the lever 29 and thence to the hookup. This latter component may be utilized in a known manner, as more fully described for example in Sanford Reissue Patent No. 17,147, to equalize the action of the right and left brakes of an automobile. The proportion of the braking torque transmitted to the anchor 27 and the proportion transmitted to the hookup through lever 29, will be determined by the angle between the line of thrust of the anchored shoe and the center line of arm 24 or 26, as the case may be. In the arrangement of Figure 1, since arm 24 (or 26) is swung in applying the brake through a substantial angle from the position shown, about half the torque will be transmitted to the anchor and about half to the hookup.

In all of the embodiments release springs, steady rests and adjustments may be provided as desired.

Figure 4:
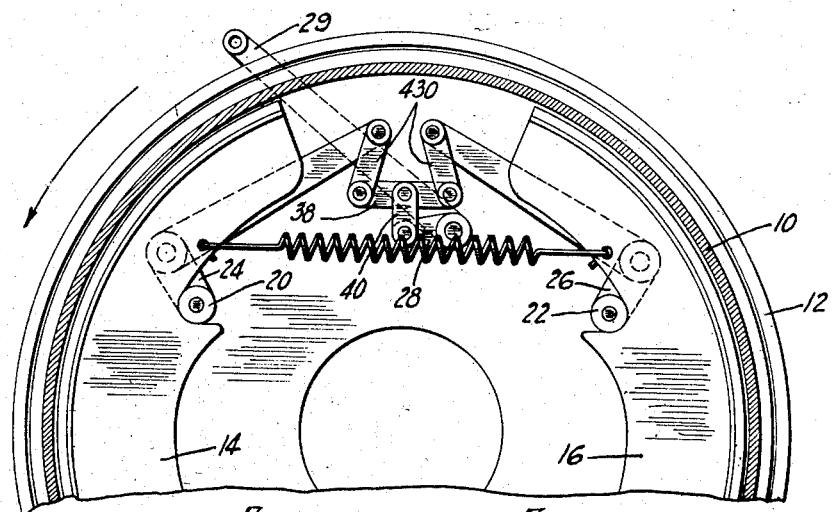
Figures 4, 5 and 6 are fragmentary views illustrating three other embodiments of the invention.

In Figure 4 the mechanism is the same except that the links 430 have been atttached to an equalizer link 38 which is attached to the lever 28 preferably by an extra link 40. This equalizer link tends to exert the same initial pressure on the two brake shoes, though as the shoes are thrust around by the drum the links may be turned to such an angle that most of the force exerted on equalizer link 38 will be applied to the bell crank which is at that time forming the anchorage. Thus if the drum is rotating in the counter clockwise direction when the brake is applied, the thrust exerted by shoe 16 upon roller 22 will tend to turn the arm 26 backward about the anchor pin 27 in a clockwise direction until equilibrium is reached between the parts of the braking torque being transmitted respectively to the anchor pivot 27 and through lever 29 to the hookup, as described above.

Figure 5:
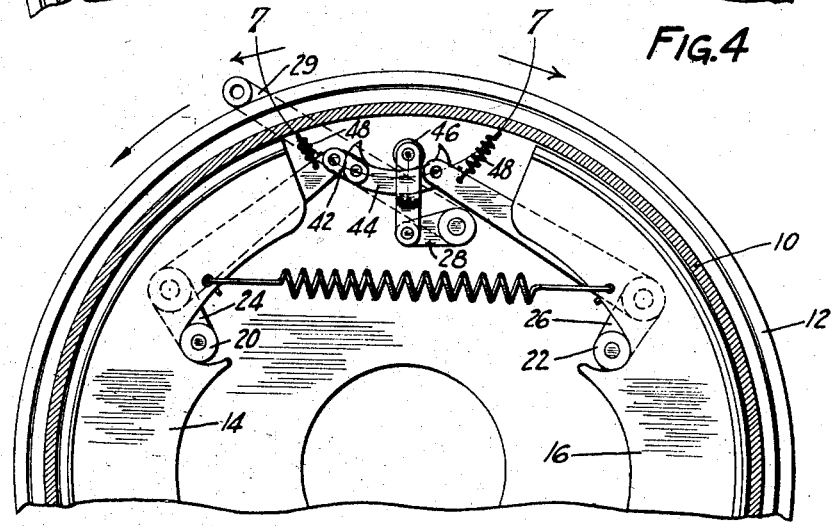

In Figure 5 arrangement has been made to relieve the actuating lever 28 of the anchoring torque. This is done by connecting the long ends of the bell cranks by two links 42 and 44 which are of such length that when the bell crank 26 is acting as an anchor, the pivot pins connecting links 42 and 44 to each other and to the bell cranks 24 and 26 will be drawn nearly but not quite into alignment. Thus the braking torque on bell crank 26 will be utilized in augmenting the actuating thrust on the other bell crank. Supposing the drum to be rotating in the direction of the arrow, it will be seen that the shoes will be thrust by the drum against the roller 22 which will move the long end of the bell crank 26 upwardly. This movement tends to straighten out the links 44 and 42 and the long arm of bell crank 24. A shifting connection has been provided between the lever 28 and link 44 so that the maximum proportion of the force exerted by actuating lever 28 may be applied to the actuating bell crank 24. Thus, under the conditions just supposed, a roller 46 positioned for travel on the link 44 and suitably connected to the lever 28 moves to the left end of link 44 nearer to the bell crank 24 which is now serving as an actuator, while the bell crank 26 is serving merely as an anchor. The thrust from the anchor 26 is taken up by straightening the links as above described and as the links approach a straight line position the component of the anchoring thrust which tends as above described to turn the bell crank 24 backward will become smaller and smaller. This will leave the control in the actuating lever 28 and when the force on this lever is released, the spring 48 will pull the arm of bell crank 24 upwardly, thereby permitting the release springs to pull the shoes from the drum.

Figure 6:
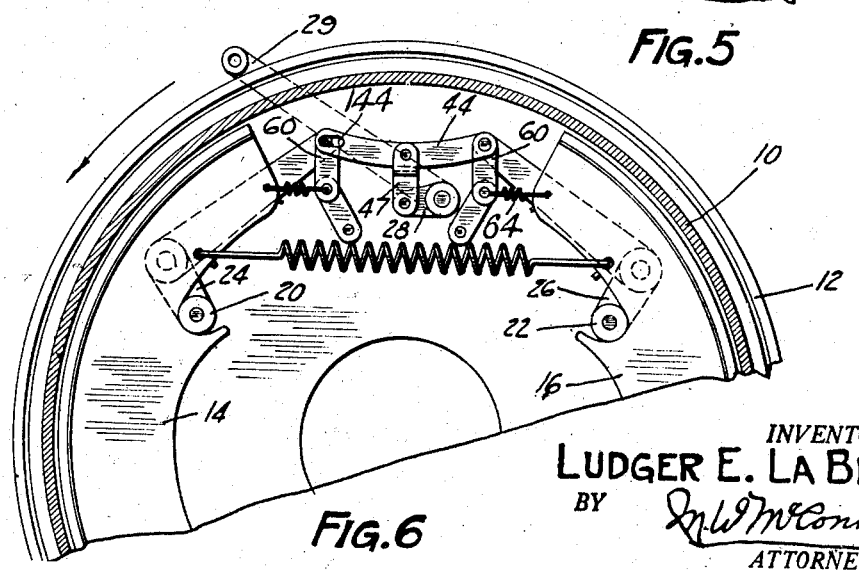

In Figure 6 a lever 29 controls the lever 28 as in the other embodiments. The lever 28 is connected by a forked link 47 to a link 44 suitably connected between the long ends of the bell crank levers 24 and 26. The operation is substantially the same as in the embodiment shown in Figure 5. In this instance, however, the anchoring torque is taken up by toggles 60 connected between the long ends of the bell crank levers and fixed supports on the backing plate. This relieves the opposite bell crank from any influence by the anchoring torque and thus overcomes all possibility of grab from this cause. The link 47 is shown pivoted to the link 44 which has an over running connection 144 to the long end of the bell crank lever 24. The lever 28 will now have complete control of the actuating thrust on brake shoe 14. When the force on this lever is released, the main release springs will pull the shoes from the drum, and a small spring 64 collapses the toggle 60.

While several illustrative embodiments have been described in detail, it is not my intention to limit the scope of the invention to those particular embodiments or otherwise than by the terms of the appended claims.

I claim:

1. Brake mechanism including a bell crank anchor mounted on a fixed pivot, a drum, a brake shoe having a surface co-acting with said anchor, the co-acting surface of the brake shoe having a curve of slightly greater radius than the radius of curvature of the co-operating surface of the bell crank lever, the remainder of the co-acting surface of the brake shoe having the axis of the drum as a center of curvature.

2. Brake mechanism including a backing plate, bell crank levers pivoted thereto, brake shoes co-acting with one arm of each of said bell crank levers, drag links pivoted together and connecting the other arms of said bell crank levers, and actuating means connected to said drag links.

3. Brake mechanism including a backing plate, bell crank levers pivoted thereto, brake shoes co-acting with one arm of each of said bell crank levers, drag links connecting the other arms of said bell crank levers, and shiftable actuating means connected to said drag links.

4. Brake mechanism including a brake drum, articulated brake shoes movable with the brake drum, bell crank levers mounted on fixed pivots, one arm of each of said levers co-acting with said shoes to alternately actuate and anchor said shoes, drag links connecting the other ends of said bell crank levers and actuating means connected to said links.

5. Brake mechanism including a brake drum, articulated brake shoes movable with the brake drum, bell crank levers mounted on fixed pivots, one arm of each of said levers co-acting with said shoes to alternately actuate and anchor said shoes, drag links connecting the other ends of said bell crank levers, a roller mounted to travel on one of said drag links, and actuating means connected to the roller.

6. Braking mechanism including friction means, bell cranks mounted on fixed pivots for alternately actuating and anchoring said friction means, one arm of each bell crank co-acting with the friction means, drag links connecting the other ends of said bell cranks, said drag links being of such length that the anchoring torque on one bell crank will be in part applied to the actuation of the other bell crank, and actuating means connected to said drag links.

7. Brake mechanism including friction means, bell cranks mounted on fixed pivots, one arm of each of said bell cranks co-acting with the friction means to alternately actuate and anchor said friction means, the other arms of said bell cranks being connected by linkage and each of said arms also being limited in its movement by a pair of links connected to a fixed pivot and actuating means connected to said first-mentioned connecting linkage.

8. Braking mechanism including a backing plate, friction means, a bell crank pivoted on said backing plate, one arm of said bell crank co-acting with the friction means to act alternatively as actuating means and anchoring means and linkage between the other arm of said bell crank lever and the backing plate and means to actuate said bell crank lever.

9. A brake, including friction means, anchoring mechanism for each end of said friction means, said anchoring mechanism comprising a pair of rollers adapted to move circumferentially relative to the friction means and maintained always in contact with both ends of the friction means, and all parts of said anchoring mechanism being constantly in contact with such parts as it contacts during anchoring.

10. Brake mechanism including a backing plate, bell crank levers pivoted thereto, friction means co-acting with one arm of each of said bell cranks, drag links attached to the other arms of said bell crank, an equalizer link extending between the first mentioned links, and actuating means attached to the said equalizing link.

11. A brake mechanism including a fixed support, friction elements movable thereon, shoulders on the inner peripheries of the friction elements, oppositely arranged bell crank levers pivoted on the support, rollers on the lever engaging the shoulders on the friction elements and equalizing connections between the levers and an actuating means connected to the equalizing means.

LUDGER ELIZÉ LA BRIE.